SWITCH MECHANISM FOR AUTOMATIC SPRING WINDING IN A CLOCK

Original Filed Sept. 30, 1968 4 Sheets-Sheet 1

INVENTOR
TOSIO UMEZAWA
BY
Wolfe, Hubbard, Voit & Osann
ATTORNEYS

INVENTOR
TOSIO UMEZAWA
BY
Wolfe, Hubbard, Voit & Osann
ATTORNEYS

INVENTOR
TOSIO UMEZAWA
BY
Wolfe, Hubbard, Voit & Osann
ATTORNEYS

July 21, 1970 TOSIO UMEZAWA 3,521,442

SWITCH MECHANISM FOR AUTOMATIC SPRING WINDING IN A CLOCK

Original Filed Sept. 30, 1968 4 Sheets-Sheet 4

INVENTOR
TOSIO UMEZAWA
BY
Wolfe, Hubbard, Voit & Osann
ATTORNEYS

United States Patent Office 3,521,442
Patented July 21, 1970

3,521,442

SWITCH MECHANISM FOR AUTOMATIC SPRING WINDING IN A CLOCK

Tosio Umezawa, Sagamihara, Japan, assignor to Jeco Company, Limited, Tokyo, Japan, a corporation of Japan Continuation of application Ser. No. 763,779, Sept. 30, 1968. This application Dec. 6, 1968, Ser. No. 795,376
Claims priority, application Japan, Sept. 29, 1967, 42/83,339
Int. Cl. G04c *1/00*
U.S. Cl. 58—41 5 Claims

ABSTRACT OF THE DISCLOSURE

A switch mechanism for an automatically spring wound clock having a drive gear driven by a helical spring. The spring is periodically rewound by means of a winding gear connected to an electric motor. A pair of spring contacts is associated with a cam element operatively connected to the drive gear so as to periodically actuate and deactuate the winding motor in response to predetermined movements of the drive gear. The cam element has a notched periphery, with one of the spring contacts riding on the periphery so that it is biased away from the other contact until it falls into the notch. The winding motor is then actuated, and the winding gear is rotated to rewind the spring until a pin depending from the winding gear returns the spring contact to the outer periphery of the cam element associated with the drive gear.

This application is a continuation of my co-pending application Ser. No. 763,779, filed on Sept. 30, 1968, which is now abandoned.

DESCRIPTION OF THE INVENTION

This invention relates generally to automatically spring wound clock and, more particularly, to an improved switch mechanism for automatically spring wound clocks.

In conventional switch mechanisms for automatically spring wound clocks, the switch contacts do not open instantaneously and, consequently, the contracts deteriorate. Heretofore, the contacts have been made to open instantaneously by means of a cam mounted on a separate shaft, but this increases the number of component parts, and the cam moves due to vibrations and shocks so that the contacts do not operate properly. The present invention is suggested to eliminate such disadvantages.

A primary object of the present invention is to provide an improved switch mechanism for automatically spring wound clocks which opens the switch contacts instantaneously, and yet is stable in the face of vibrations, shocks and the like so that the contacts do not deteriorate even over long operating periods.

Another object of the present invention is to provide such an improved switch mechanism for automatically spring wound clocks which provides positive opening of the switch contacts to insure stable and reliable operation thereof.

Other objects and advantages of the invention will become apparent from the following detailed description and upon reference to the accompanying drawings, in which.

While the invention will be described in connection with certain preferred embodiments, it will be understood that it is not intended to limit the invention to such embodiments but, to the contrary, it is intended to cover all alternatives, modifications and equivalents as may be included within the spirit and scope of the invention as defined by the appended claims.

Figure 1:
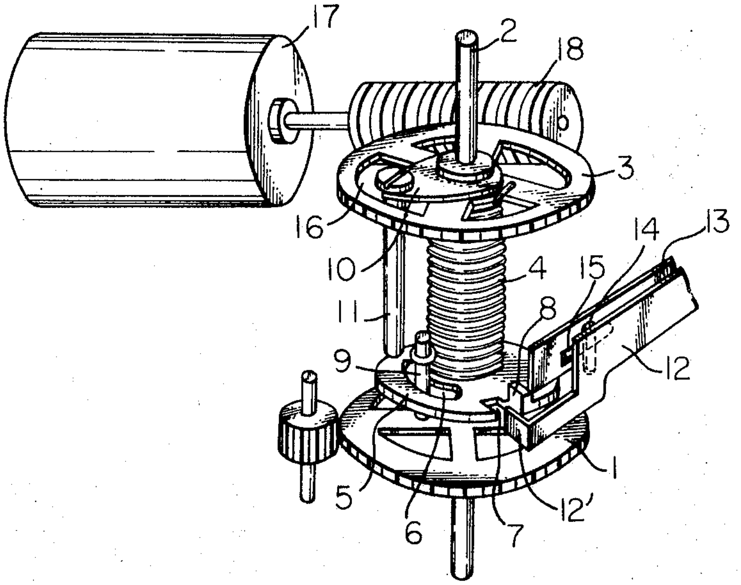
FIG. 1 is a perspective view of one embodiment of a switch mechanism embodying the present invention.

Turning now to the drawings and referring first to FIG. 1, a gear 1 fixed to a shaft 2 drives a clock mechanism in response to unwinding movement of a helical drive spring 4. The spring 4 is periodically rewound by a winding gear 3 rotatably mounted on the shaft 2 and driven by a motor 17 via a worm gear 18. The helical spring 4 is connected at one end to the gear 3 and at the other end to a stud 9 projecting longitudinally from the gear 1 so that the gears 1 and 3 are connected with each other through the helical spring 4. Actuation and deactuation of the wind drive motor 17 is controlled by a pair of contact springs 12 and 13 which are biased against each other to be normally closed; however, the springs 12 and 13 are held open by a control mechanism to be described below, and only periodically closed to actuate the motor 17 and thereby rewind the spring 4 via the winding gear 3.

In accordance with the present invention, the spring contacts 12 and 13 are controlled by first cam means responsive to movement of the drive gear and operatively associated with the spring contacts, the first cam means having a first cam surface for opening the contacts and a second cam surface for closing the contacts to actuate the winding motor after a predetermined movement of the drive gear, and second cam means responsive to movement of the winding gear and operatively associated with the spring contacts and the first cam means for relatively moving the spring contacts from the second cam surface to the first cam surface to deactuate the winding motor after a predetermined movement of the winding gear. Thus, in the illustrative embodiment, a cam 5 is provided with arcuate slot 6, a peripheral groove or notch 7 and a projection 8 extending from one edge of the notch 7 vertically to the surface of the cam 5, and is rotatably fitted to the shaft 2. The drive gear stud 9 is inserted in the arcuate slot 6 in the cam 5 so that the cam 5 and drive gear 1 are freely rotatable relative to each other only in the range of the arcuate slot 6. The contact spring 12 is so arranged that a bent part 12' at the tip is movable into and out of the notch 7. The other contact spring 13 is mounted opposite the contact spring 12 in normally closed relationship therewith. The contact springs 12 and 13 are provided respectively with contacts 14 and 15, and the contact springs 12 and 13 are electrically connected in series with the motor circuit so as to control the current supply to the motor 17 from an electric source (not illustrated).

Associated with the winding gear 3 is a driving lever 10 fitted rotably to the shaft 2. A driving pin 11 projecting longitudinally from the driving lever 10 is passed through a sector hole 16 in the gear 3 so that the tip of the pin 11 engages the projection 8 provided on the cam 5 when the two elements are adjacent one another.

Figure 2:
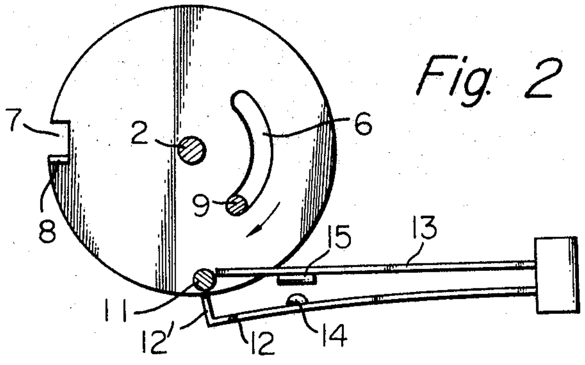
FIGS. 2 through 9 are a series of plan views of the cam control means of the mechanism shown in FIG. 1, in various stages of operation.

The operation of the illustrative switch mechanism for automatic spring winding in accordance with the present invention will be apparent from FIGS. 2 through 7 in which:

FIG. 2 shows a state in which the contacts 14 and 15 are open. Due to the force of the helical spring 4, the drive gear 1 rotates while moving the clock mechanism (not illustrated) and thus rotates the cam 5, via the stud 9, in the direction indicated by the arrow. Meanwhile, the tip of the contact spring 12 rides on the periphery of the cam 5.

Figure 3:
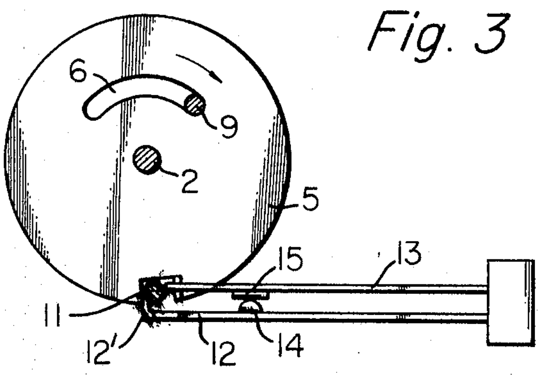

FIG. 3 shows a state in which the cam 5 has further rotated from the state shown in FIG. 2 and the bent part 12' of the contact spring 12 has fallen into the notch 7 in the cam 5 so that the contacts 14 and 15 are closed.

Figure 4:
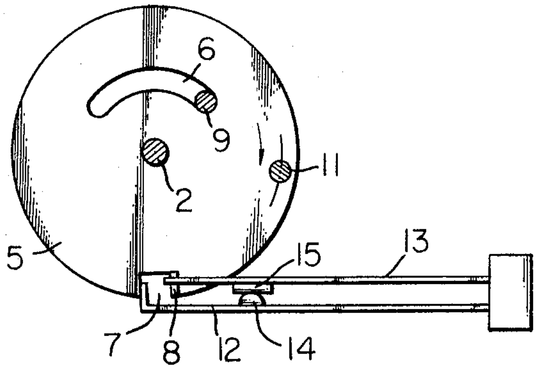

FIG. 4 shows a state in which the contacts 14 and 15 are still closed, as in FIG. 3, and the motor 17 is rotating to rotate the gear 3 through the worm 18. The gear 3 in turn advances driving pin 11 in the direction indicated by the arrow.

Figure 5:
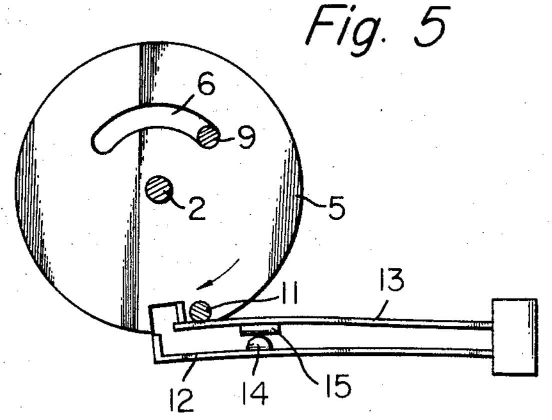

FIG. 5 shows a state in which the contacts 14 and 15 are still closed, and the driving pin 11 has advanced into engagement with the contact spring 13 so that both springs 13 and 12 are cammed radially away from the cams 5, thereby retracting the bent part 12' of the spring 12 from the notch 7 in the cam 5.

Figure 6:
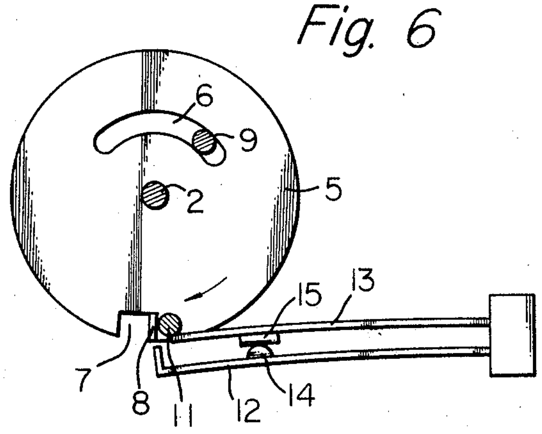

FIG. 6 shows a state in which the contacts 14 and 15 are still closed, and the driving pin 11 has advanced into engagement with the projection 8 and pushed the projection 8 beyond the forward end of the spring 13. The pin 11 still engages the spring 13 so that the springs 13 and 12 are still cammed away from the cam 5, and the notch 7 in the periphery of the cam 5 is advanced beyond the forward end of the spring 12.

Figure 7:
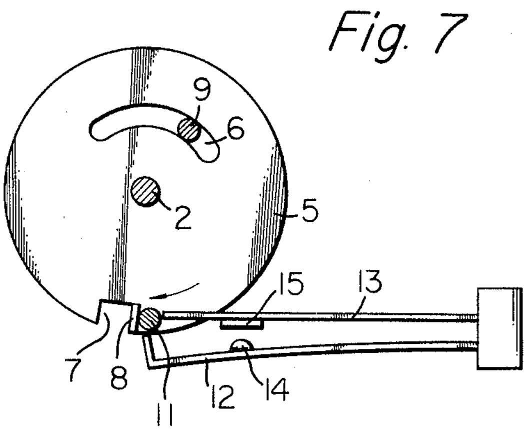

FIG. 7 shows a state in which the contact spring 13 has just disengaged from the driving pin 11 so that the spring 13 is returned to its normal position, and the tip of the contact spring 12 rides on the periphery of the cam 5. Consequently, the spring 112 is cammed away from the spring 13 to open the contacts 14 and 15 and thereby deactuate the motor 17. Thus, one winding cycle has just been completed. As can be seen in both FIGS. 6 and 7, advancement of the cam 5 relative to the drive gear 1 and the stud 9, in response to the pushing of pin 11 against projection 8, is permitted by the arcuate slot 6 in the cam 5.

The clock continues to operate by repeating the operations in FIGS. 2 to 7 as described above.

Figure 8:
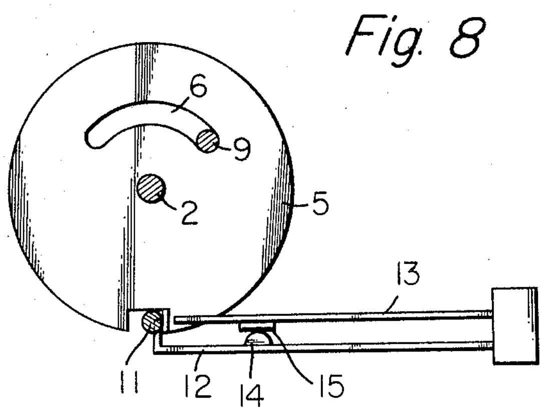
Figure 9:
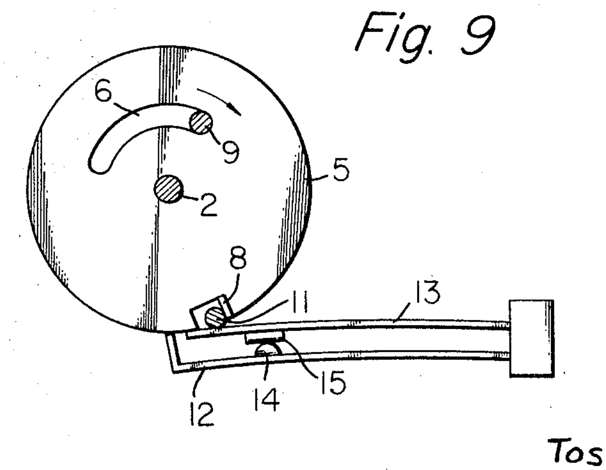
Figure 10:
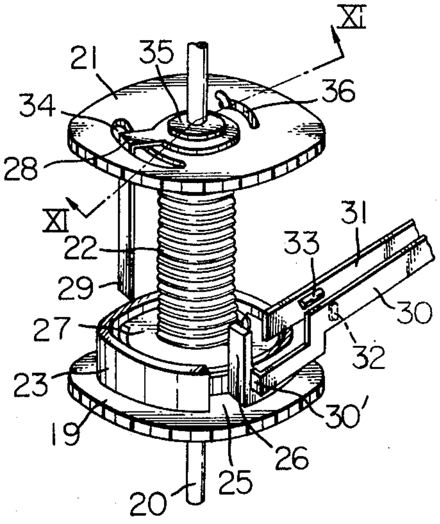
FIG. 10 is a modified embodiment of a switch mechanism embodying the present invention.
Figure 11:
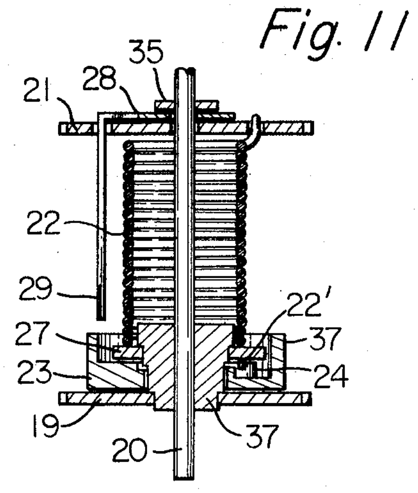
FIG. 11 is a vertical section taken along line 11—11 in FIG. 10.
Figure 12:
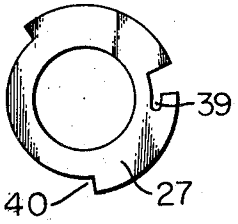
FIG. 12 is a plan view of one component of the mechanism shown in FIGS. 10 and 11.
Figure 13:
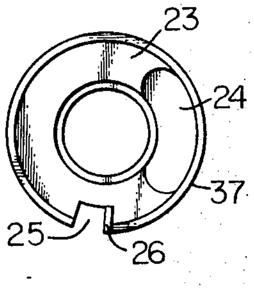
FIG. 13 is a plan view of another component of the mechanism shown in FIGS. 10 and 11.

In case the electric source is disconnected from the clock during the normal operation or in case the motor does not operate, though the contacts are closed, due to a reduction in the battery voltage or the like, the tip of the contact spring 112 simply remains in its advanced position in the notch 7, as shown in FIG. 8. Consequently, when the clock is stopped, the contacts are closed, and when a new electric source is connected, the motor 17 will wind in the helical spring 4, due to the operations in FIGS. 4 to 7, and the normal operation will be restored.

In case the electric source is disconnected during the operation of the motor 17, e.g. in the state shown in FIG. 5 or 6, the stud 9 continues to rotate the cam 5 with the drive gear 1 so that the projection 8 of the cam 5 pushes the driving pin 11 until the clock stops in the state shown in FIG. 8. Therefore, the spring 4 will not be over-unwound. Moreover, since the clock stops while the contacts are closed, if the electric source is connected again the normal operation will be restored by the operations shown in FIGS. 4 to 7.

A further embodiment of the present invention is illustrated in FIGS. 10 to 13. Thus in FIG. 10, a drive gear 19 on a shaft 20 is connected to a clock mechanism (not shown). The gear 19 is fixed to a collar 37 (FIG. 11) which in turn is fixed to the shaft 20. A winding gear 21 driven by a motor is rotatably fitted to the shaft 20, and a helical spring 22 is engaged at one end with a slot 36 in the winding gear 21 and at the other end with a hollow 39 (FIG. 12) in a ring 27 fixed to the collar 37 in the same manner as the drive gear 19. Thus, it can be seen that the gears 19 and 21 are connected to each other through the helical spring 22. A cam 23 is rotatably fitted around the collar 37 and is held by the ring 27 and gear 19 from above and below. Further, said cam 23 is provided with an arcuate slot 24, a notch 25 and a projection 26 extending from one edge of the notch 25 vertically to the surface of the cam 23. The end of the helical spring 22 which engages the hollow 39 in the ring 27 extends beyond the ring 27 into the slot 24, as indicated at 22' in FIG. 11, so that the cam 23 may freely rotate relative to the ring 27 and gear 19 only in the arcuate range of the arcuate slot 24. Cooperating with the cam 23 is a contact spring 30 having a bent part 30' at the forward end in contact with the outer peripheral surface 38 of the cam 23 so that when the cam 23 rotates the bent part 30' drops into the notch 25.

A second contact spring 31 is provided opposite the contact spring 30 and the two contact springs 30 and 31 are provided respectively with contacts 32 and 33. A driving lever 28 is fitted rotatably to the shaft 20 and held by a disc 35 and the gear 21 from above and below, respectively. The driving lever 28 is bent at a right angle so as to extend downwardly through the slot 34 in the gear 21 so that it is freely rotatable only in the range of the arcuate slot 34. Further, the driving lever 28 is arranged so that its end portion 29 comes into contact with the projection 26 of the above mentioned cam 23 and the contact spring 31 when the cam rotates.

The operation of the embodiment shown in FIGS. 10–13 is exactly the same as that of the embodiment of FIG. 1 described previously.

As can be seen from the foregoing detailed description, the present invention provides a highly reliable automatic winding operation. Even if the electric source is removed during the normal operation of the mechanism or while the winding motor is operating, the contacts will remain in the closed state so that when the electric source is restored, the normal operation will be restored.

Further, as the opening and closing of the contacts is instantaneous, there will be no trouble. As the cam is set coaxially with the main spring, the structure is simple. As the contact spring will press the cam on the outer periphery almost all the time during the operation, the cam will not vibrate.

Various modifications of the invention will be apparent from the foregoing description. For example, instead of fixing the gear 1 to the shaft 2, the gear 3 may be fixed to the shaft 2 and the gear 1 may be rotatably fitted to the shaft 2. Further, all the component parts on the shaft may be fitted rotatably. Even if the driving lever 10 is fixed to the shaft 2, it will operate the same as is described above. Further, the cam 5 may be fixed to the shaft 2.

I claim as my invention:

1. A switch mechanism for an automatically spring wound clock, said mechanism comprising the combination of a drive spring and drive means operatively connected to one end of said spring for driving a clock mechanism in response to the unwinding of said spring, winding means operatively connected to the other end of said spring and adapted to be driven by a winding motor for periodically winding said spring, a pair of spring contacts for actuating and deactuating the winding motor, winding control means including first cam means responsive to movement of said drive means and associated with said spring contacts, said first cam means having a first cam surface for opening said contacts and a second cam surface for closing said contacts to actuate the winding motor after a predetermined movement of said drive means, and a camming pin extending longitudinally from and movable with said winding means and adapted to cooperate with said spring contacts and a longitudinal projection on said first cam means whereby in each revolution of said winding means said pin cams said spring contacts outwardly away from said second cam surface and then engages said projection to advance said first cam means relative to said contacts whereby said contacts are relatively moved from said second cam surface to said first cam surface.

2. A switch mechanism as set forth in claim 1 wherein said spring contacts are normally closed, said first cam surface is adapted to cam said contacts away from each other to deactuate the winding motor during a major portion of each revolution of said drive means, and said second cam surface is adapted to release said contacts so that they return to their normally closed positions to actuate the winding motor after a predetermined movement of said drive means.

3. A switch mechanism as set forth in claim 1 wherein said first cam means is mounted for limited relative movement ahead of said drive means, and said camming pin is adapted to release said spring contacts from said second cam surface and advance said first cam means relative to said drive means in response to movement of said winding means so as to return said contacts from said second cam surface to said first cam surface.

4. A switch mechanism as set forth in claim 1 wherein said first cam means is a disc and said first cam surface is formed by the periphery of said disc, said periphery being notched to form said second cam surface, and said spring contacts are normally closed with one of the spring contacts riding on said periphery of said disc to bias said one contact away from the other contact to an open position.

5. A switch mechanism as set forth in claim 1 wherein said pin is mounted for limited movement relative to said winding means.

References Cited

FOREIGN PATENTS 153,911 1/1903 Germany.

RICHARD B. WILKINSON, Primary Examiner
E. C. SIMMONS, Assistant Examiner

U.S. Cl. X.R.

200—38